United States Patent [19]
Ono et al.

[11] 3,855,376
[45] Dec. 17, 1974

[54] PROCESS FOR MAKING STRUCTURAL MATERIAL HAVING A FOAMED INNER LAYER

[75] Inventors: Kazuo Ono; Tadao Tsuchiya; Akio Kawamoto, all of Tokyo, Japan; Jun Nakada, Tokorozawa, Japan

[73] Assignees: Mitsubishi Rayon Company Ltd.; Shin-Kobe Electric Machinery Company Limited, both of Tokyo, Japan

[22] Filed: Dec. 8, 1972

[21] Appl. No.: 313,261

Related U.S. Application Data
[62] Division of Ser. No. 134,312, April 15, 1971.

[30] Foreign Application Priority Data
Apr. 24, 1971 Japan.............................. 46-39407

[52] U.S. Cl..................... 264/46.1, 9/6, 52/DIG. 7, 180/89, 264/171
[51] Int. Cl.......................... B29d 27/00, B29f 3/00
[58] Field of Search .................. 264/45, 46, 47, 171

[56] References Cited
UNITED STATES PATENTS

| | | | |
|---|---|---|---|
| 3,331,900 | 7/1967 | Thomas .............................. | 264/47 |
| 3,444,036 | 5/1969 | Russell et al...................... | 264/47 X |
| 3,461,197 | 8/1969 | Lemelson......................... | 264/47 X |
| 3,523,988 | 8/1970 | Roehr et al............................ | 264/41 |
| 3,558,753 | 1/1971 | Edlin.................................... | 264/54 |
| 3,764,642 | 10/1973 | Boutillier.............................. | 264/47 |

FOREIGN PATENTS OR APPLICATIONS
954,069   4/1964   Great Britain....................... 264/47

*Primary Examiner*—H. S. Cockeram
*Attorney, Agent, or Firm*—Wenderoth, Lind & Ponack

[57] ABSTRACT

A synthetic resin structural material comprising surface layers and an intersticed inner layer having an expansion ratio between 1.3 and 5, which are integrally bonded together through interfused layers thereof.

A process for producing the above-described synthetic resin structural material, comprising introducing surface layer-constituting molten resin and an inner layer-constituting molten resin with a blowing agent blended therein into a die from separate entrances respectively, joining the flows of the respective resins within the die in such a manner that the inner layer-constituting resin flow is sandwiched by the surface layer-constituting resin flows and the resins are not mixed with each other, leading the joined resin flows towards an exit of the die while gradually cooling and hardening the surface layer-constituting resins and applying a suitable pressure to the outer surfaces of said resin flows, discharging the joined resin flows from said die, whereupon said pressure is removed allowing, the inner layer-constituting resin to foam into an intersticed structure, and then regulating the thickness of the thus formed structural material by thickness regulating members.

10 Claims, 11 Drawing Figures

COMPARISON IN RIGIDITY BETWEEN ABS 3-LAYERED STRUCTURAL MATERIAL AND OTHER STRUCTURAL MATERIALS

COMPARISON IN SHOCK ABSORBING PROPERTY BETWEEN ABS 3-LAYERED STRUCTURAL MATERIAL AND OTHER STRUCTURAL MATERIALS

PROCESS FOR MAKING STRUCTURAL MATERIAL HAVING A FOAMED INNER LAYER

This is a division, of application Ser. No. 134,312, filed April 15, 1971.

This invention relates to synthetic resin structural materials and a process for producing the same.

As a synthetic resin structural material, there has been developed and used one of the honeycomb structures in which a honeycomb core layer of a synthetic resin material is sandwiched by surface layers consisting of a synthetic resin plate with a view to reducing the weight and increasing the rigidity of the structural material to a degree similar to that of aluminum structural material. This type of structural material, however, is poor in shaping property and expensive, and has a limited scope of application. There has also been known a synthetic resin structural material in which an intersticed synthetic resin core layer is sandwiched by synthetic resin plate-like surface layers, similar to the preceding synthetic resin structural material. This prior art structural material, however, has the deficiency that the individual layers tend to separate from each other during use because these layers are previously formed individually and then bonded together integrally by means of an adhesive. In addition, when both surface layers of the type of structural material described above are formed of the same type of resin and a weather-proofing or heat-resisting resin is used for the formation of the surface layers to impart weatherability or heat-resistance to one of the surfaces of the structural material which is to be exposed to light or heat, the other surface layer which is not required to be weather proof or heat resistant, is also formed of the same resin, which is disadvantageous economically. On the other hand, when the surface layers are formed of a resin material which is not weather-proof of resistive to heat, a weather-proof or heat-resisting layer must be formed on top of one of the surface layers of the resultant structural material, to impart weatherability or heat-resistance to said one surface layer, which necessitates a cumbersome secondary working. Similarly, when the color of the resin material of which the surface layers of the structural material are formed, is selected to match the color of one surface layer, the other surface layer must be coated with a layer of different color which is desired, subsequent to the production of the structural material, which also necessitates a cumbersome secondary working.

The present invention has been achieved in view of the foregoing deficiencies of the prior art structural materials, and a primary object of the invention is to provide a novel synthetic resin structural material which is light in weight and has excellent rigidity, shock-absorbing property, heat-resistance, sound-proof property and sound absorbing property, and which is free of interlayer separation and each in secondary working.

Another object of this invention is to provide a novel process for producing the synthetic resin structural material described above continuously at a low cost.

In order to attain the first-mentioned object, the synthetic resin structural material according to the invention comprises plate-like synthetic resin surface layers and an intersticed synthetic resin inner layer having an expansion ratio between 1.3 and 5, said surface and inner layers being bonded together by themselves integrally through interfused layers.

The structural material of the instant invention has the advantage that, since the plate-like surface layers and the intersticed inner layer are integrally bonded together through the interfused layers as stated above, the bonding strength of the layers is extremely strong and the layers will not be separated from each other during use, as have been in the conventional structural materials. Another advantage is that, since the inner layer has an intersticed structure having an expansion ratio between 1.3 and 5 as stated above, reduction of the weight and increasing of the rigidity of the structural material can be achieved simultaneously. Namely, if the expansion ratio of the intersticed inner layer is smaller than 1.3, a sufficient weight reducing effect cannot be obtained, whereas if the expansion ratio exceeds 5, the intersticed inner layer will become undesirably soft and fragile, rendering the structural material as a whole unsatisfactory in respect of rigidity. However, according to the invention both the weight reducing effect and the rigidity increasing effect can be obtained by selecting the expansion ratio within the range specified above. The structural material of the invention is also advantageous in that, since it is composed of the plate-like surface layers and the intersticed inner layer as stated above, when an impact force is applied to either one of the surface layers, the striking energy is absorbed by the elastic deformation of the whole structural material and the damage to the structural material can be reduced to a minimum. Furthermore, because of the intersticed inner layer, the structural material of the invention has a heat insulating property, a sound-proofing property and sound absorbing property, and can be used in a wide scope of application. The structural material of the invention is produced by integrally bonding the plate-like surface layers and the intersticed inner layer with each other through the interfused layers as stated above. Therefore, by coloring the front surface layer-constituting resin and the back surface layer-constituting resin in different colors from each other, in the stage of fusion-bonding, a structural material having surface layers of different colors can be obtained. It will be understood, therefore, that when a structural material having a white color on the front surface and a red color on the back surface is selectively used for the outside pannel of a boat for example, the desired colors of the outside plank can be obtained concurrently with the building of the boat and the subsequent painting can be eliminated which would otherwise be necessary. Likewise, when one of the inner and outer surfaces of the product structural material is to be exposed to light or heat, the desired property can be imparted to said surface by forming the surface layer of a resin material different from that of the other surface layer, e.g., a weather-proof resin (including resin having a weatherability stablizing agent blended therein) or an incombustible resin (including a resin having an incombustible agent blended therein), and subjecting said surface layer to a necessary processing; and therefore, the necessity of covering said surface with a weather-proof material or incombustible material can be eliminated. As described above, the use of the structural material according to the invention brings about the excellent advantage that the operation of painting the surface of the structural material or covering the same with a different material subsequent to the formation of the structural material can be eliminated and hence the secondary working of the same can be much simplified as compared with the conventional ones.

Further, in order to attain the second-mentioned object, according to the invention there is provided a process comprising introducing surface layer-constituting molten resins and an inner layer-constituting resin with a blowing agent blended therein into a die from different entrances, joining the flows of the respective molten resins in such a manner that the inner layer-constituting resin is interposed between the surface layer-constituting resins and the respective resins are not mixed together by the formation of eddy flows, leading the flows of the respective resins towards an exit while progressively lowering the temperature of the surface layers thus formed thereby to increase the viscosity of said resins and also applying a suitable pressure to the surface layers to shape the outer surfaces of said surface layers, upon completion of the shaping extruding the thus formed structural material from the die, whereby the pressure is removed from the surface layers and the inner layer-constituting resin is foamed, and then regulating the thickness of the structural material by means of thickness regulating members. By the process described above, the structural material of the invention can be produced continuously at a low cost. In practicing the process of this invention, when the surface layer-constituting molten resin and the inner layer-constituting molten resin with the blowing agent blended therein are introduced into the die from separate passageways, the pressures and velocities of the respective resin flows are regulated to be the same, by a regulating valve provided in each of said passageways, and the respective resin flows move towards the joining point, with the intersticed inner layer-constituting resin being prevented from foaming. Then, the resin flows are joined at the joining point in such a manner that the intersticed inner layer-constituting resin is interposed between the surface layer-constituting resins and the resulting structural material proceeds towards the exit. In this case, the viscosities of the surface layer-constituting resins are progressively increased and then a suitable pressure is applied to the so formed surface layers, whereby the outer surfaces of said surface layers are shaped. Finally, the structural material is extruded from the die, whereupon the pressure is removed and the inner layer-constituting molten resin is foamed. The thickness of the structural material is regulated by passing said structural material between the thickness regulating members. From the foregoing description, it will be understood that the structural material comprising plate-like surface layers and an intersticed inner layer can be produced only by introducing the surface layer-constituting molten resin and the inner layer-constituting molten resin into the die. Therefore, by employing the subject process, the production procedure can be simplified, the production cost can be drastically reduced and the structural material of the construction described above can be produced at a low cost, as compared with the conventional process in which the surface and inner layers are previously formed separately and then bonded together by means of an adhesive. Further, in the process of this invention, as described above, the resins of the respective layers are joined in a molten state in such a manner that they are not mixed together, so that the surface and inner layers are independent of each other and are integrally bonded together through interfused layers formed at the boundaries of said layers. Therefore, the surface and inner layers of the product structural material are fastly bonded together and will not be readily separated from each other even when a large external force is imposed on the structural material. Still further, in the process of this invention, the outer surfaces of the surface layers are shaped by applying suitable pressure to the surface layers at the point when the viscosities thereof have been increased and thereafter, the structural material is extruded from the die to foam the inner layer-constituting resin and at the same time the thickness of said structural material is regulated by the thickness regulating members for example thickness regulating rolls, so that the shaping of the surfaces and the regulation of the thickness of the structural material can be achieved.

Other advantages and features of the present invention will become apparent from the following description when taken in conjunction with the accompanying drawing.

Figure 9:
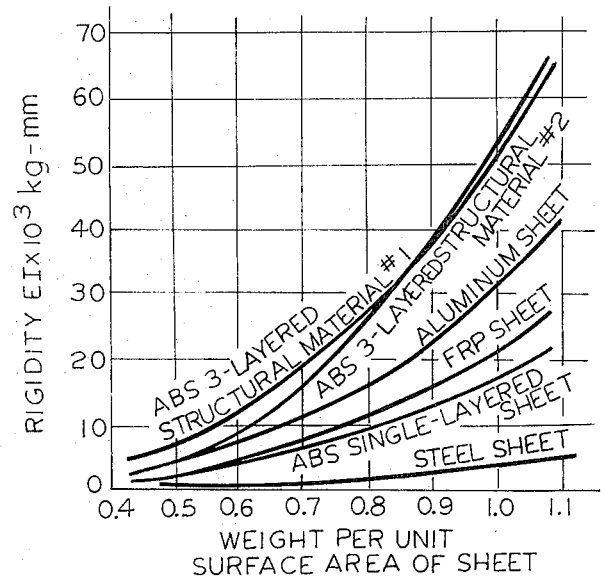
Figure 10:
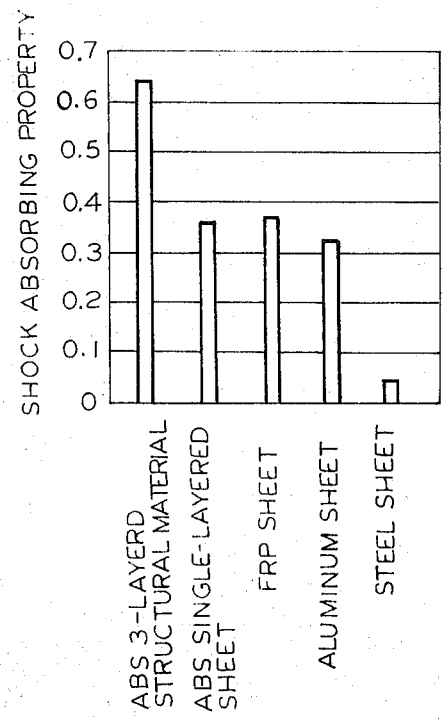
Figure 11:
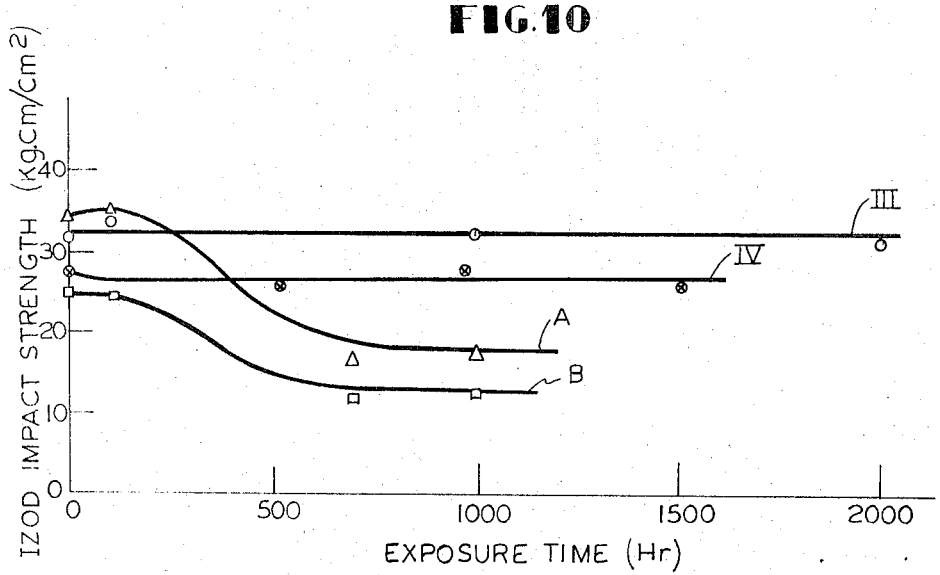

FIGS. 9 and 10 are graphs showing, in comparison, the physical properties of the synthetic resin structural material according to the invention and those of a prior art structural material of the same type; and FIG. 11 is graphs showing the varying strengths of the structural material according to the invention and the prior art structural material when said structural materials are exposed to the atmosphere.

Figure 1:
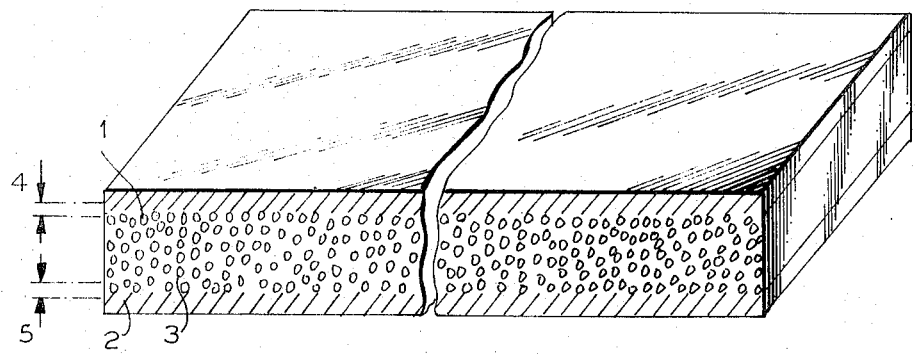
FIG. 1 is a perspective view, partially in section, of an embodiment of the synthetic resin structural material according to the present invention.
Figure 2:
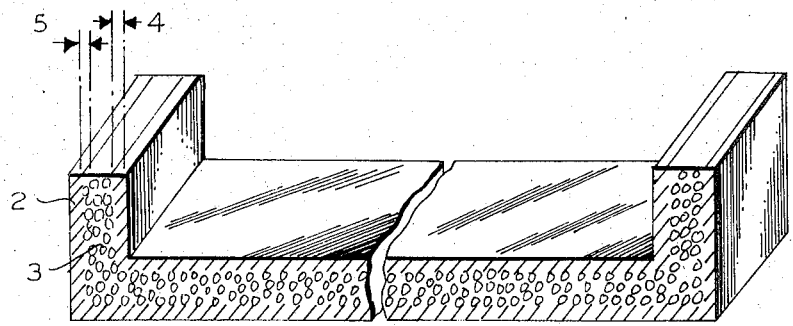
FIG. 2 is a perspective view, partially in section, of another embodiment of the synthetic resin structural material according to the invention.
Figure 5:
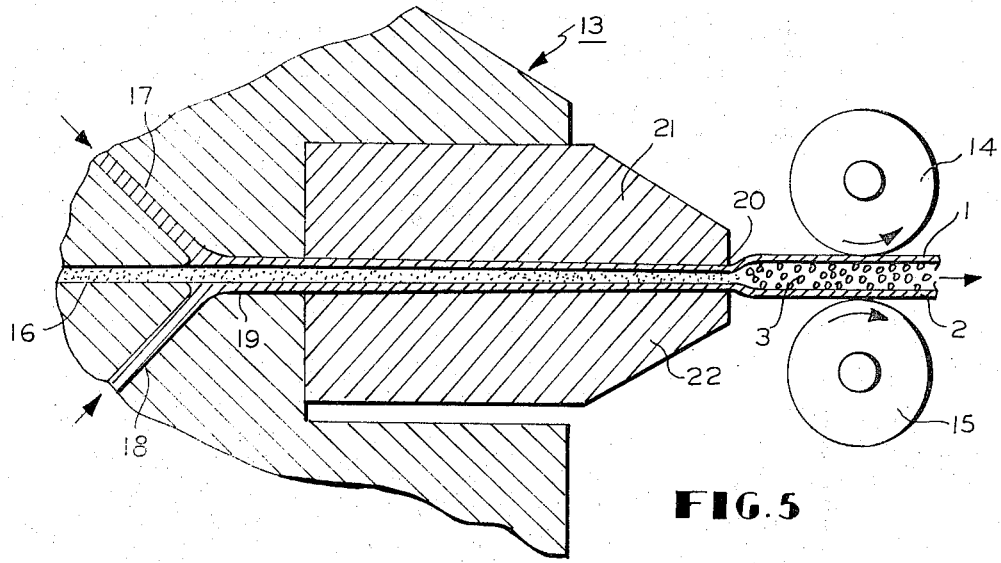
FIG. 5 is a vertical cross-sectional view illustrating, in an enlarged scale, the process of producing the synthetic resin structural material according to the invention.
Figure 3:
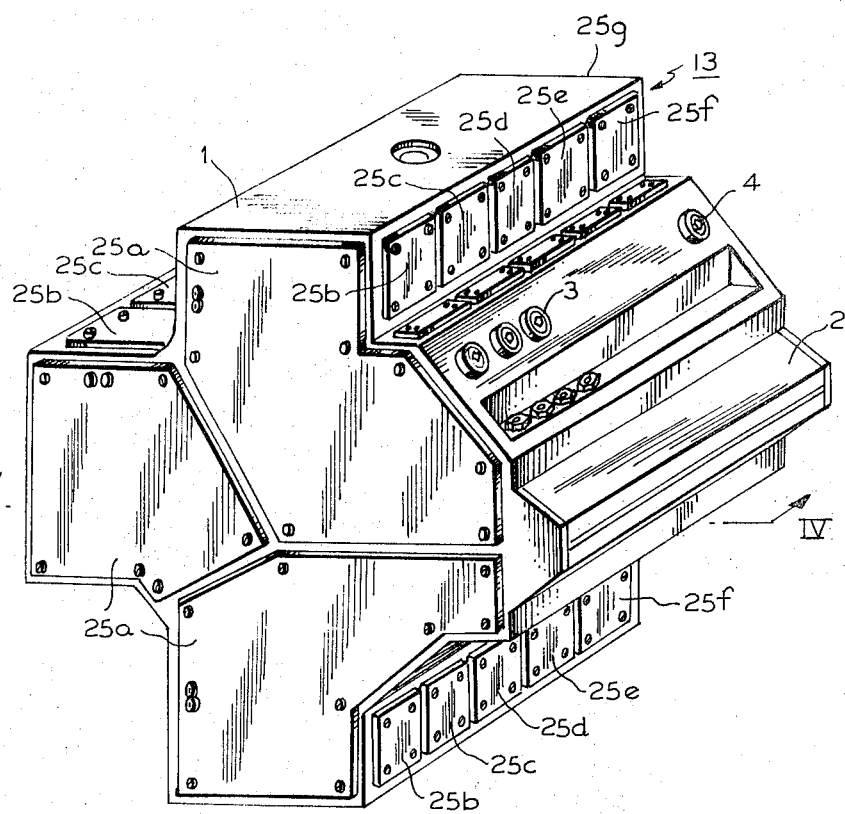
FIG. 3 is a perspective view of one form of the die used in the production of the synthetic resin structural material according to the invention.

The structural material of the invention will be described in detail by way of example hereunder: In FIG. 1, reference numeral 1 designates a plate-like layer of a synthetic resin material having a smooth surface, 2 a plate-like layer having a smooth surface similar to the plate-like layer 1, and 3 an intersticed layer having a void ratio of 1.3 – 5 (the specific gravity being 0.8 – 0.2). These layers 1,2 and 3 are integrally bonded together through interfused layers 4 and 5. FIG. 2 shows another embodiment of the structural material according to the invention which is formed into a specific shape, same portions as those of FIG. 1 being indicated by same reference numerals. The structural materials shown in FIGS. 1 and 2 are produced by extruding the molten resins of the respective layers 1, 2 and 3 through extruders and joining the extruded resin flows within a die to form the interfused layers 4 and 5. Since the plate-like layers 1, 2 and the intersticed layer 3 are integrally bonded together by the interfused layers 4 and 5 are stated above, the bonding strength is extremely large and the layers are not readily separated from each other during use. In this type of structural material, if the void ratio of the inner layer 3 is smaller than 1.3 (specific gravity 0.8), a satisfactory weight reducing effect cannot be obtained, whereas if the void ratio is larger than 5, the structural material will become soft and fragile, and the rigidity of the structural material is degraded. According to the invention the void ratio of the inner layer is made not smaller than 1.3 but not larger than 5, so that said layer has both a weight reducing effect and rigidity increasing effect. Further, since the whole structural material is composed of the plate-like layers 1,2, the intersticed layer 3 and the interfused layers 4,5 as described above, when the structural material undergoes an impact force, the whole structural material is elastically deformed to absorb the striking energy and the damage to any portion thereof can be reduced to a minimum. The structural material has a further advantage that heat or sound applied to one of the plate-like layers 1 and 2 is absorbed by the intersticed layer 3 and not transmitted to the other layer. Furthermore, because of the construction described above, the structural material can be formed by the commonly used vacuum forming machine or heat-press forming machine, and the product structural material can be used in a wide scope of application, owing to the various advantages set forth above.

The structural material of the invention is basically constructed as described above and has the functional effects set forth above. However, the following modifications are possible to the surface layers 1 and 2: Namely, in one modification the colors of the surface layers 1 and 2 can be differentiated. For instance, the front surface of the structural material may be colored in white color and the back surface thereof in a brown color by using colored resins for the formation of the surface layers 1 and 2. By selectively using such structural material for the outside plank of a boat for example, the desired colors can be obtained concurrently with the formation of the outside plank. Therefore, the subsequent painting or other operation can be eliminated and thereby the secondary working can be substantially simplified.

Figure 6:
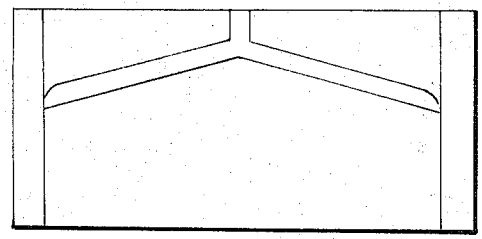
FIGS. 6 and 7 are a plan view and a side view respectively, showing a primary passageway of the die.
Figure 7:
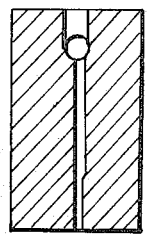
Figure 4:
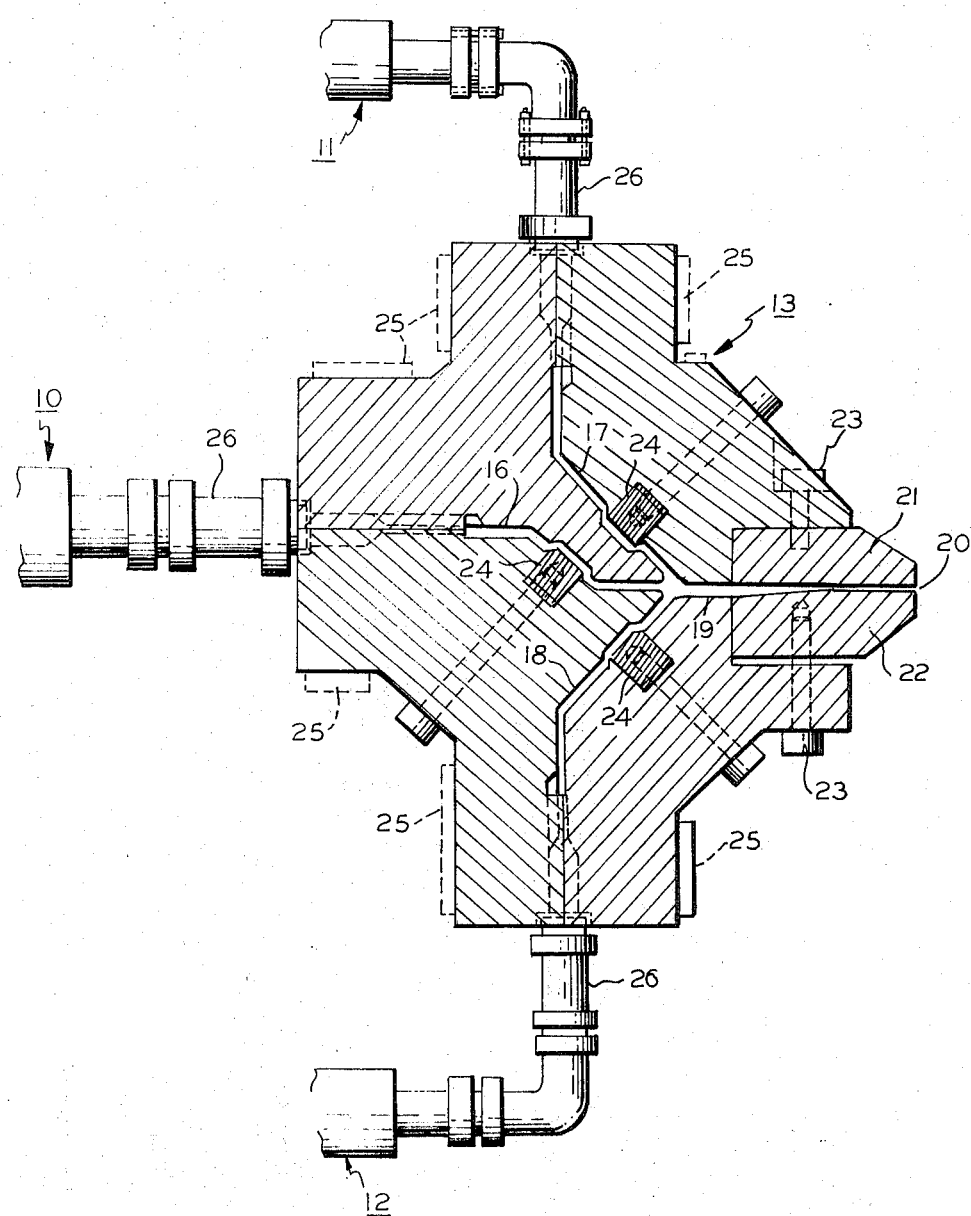
FIG. 4 is a vertical cross-sectional view taken on the line IV—IV of FIG. 3.
Figure 8:
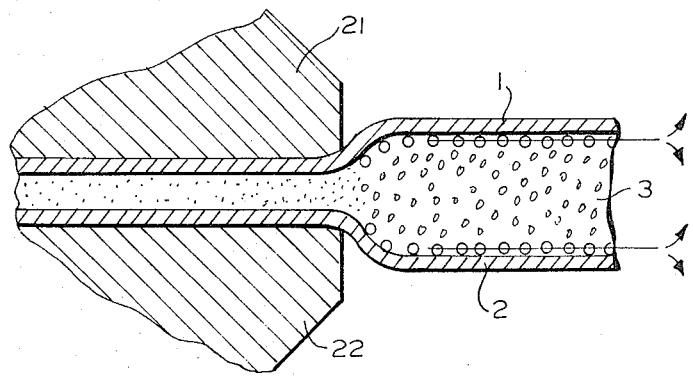
FIG. 8 is a diagrammatical illustration showing oversized voids formed at the boundaries of the surface and inner layers at the joining point when the temperatures of the surface layer-constituting resins are 10°C. or more higher than the temperature of the intersticed inner layer-constituting resin.

It is also possible to use different types of resin for the formation of the surface layers 1 and 2. The necessity for using different types of resin material for each layer arises in case that the structural material is applied to outdoor use as a signboard. In general, synthetic resins have such a property that when exposed to ultraviolet rays, the surface thereof is deteriorated and the shock resistance is lowered. Heretofore, such deficiency has been dealt with by forming a coating layer on the exposed surface or attaching a synthetic resin sheet or film having good weatherability to said surface by means of an adhesive. However, such operation not only renders the secondary working cumbersome but increases the producing cost, and in addition, such coating layer or synthetic resin sheet or film tends to separate from the surface of the synthetic resin during use of the product. Particularly, ABS resin which is a kind of thermoplastic synthetic resin, is used for various applications owing to its large impact strength, but the impact strength decreases when it is exposed outdoor for a long time, because of butadiene contained therein. In order to obviate such disadvantage, a resin comprising acrylic rubber instead of butadiene (FIG. 11 (B)) or a weather-proof resin consisting of copolymer of methyl methacrylate (FIG. 11 (A)) has been reviewed. However, these improved resins are obviously expensive, adding to the cost of the structural material, and moreover, use of a single layer plate made of such resin for a signboard or the like is very uneconomical because only one side of the plate is exposed directly to ultraviolet rays and the other side is not required to have weatherability. Furthermore, as may be seen from curves A and B in the graph of FIG. 11 (wherein A and B represent the single layers plates of these resins each having a thickness of 1 mm), the result of the impact test conducted on these resins revealed that continuous exposure of the resins to ultraviolet rays results in a considerable lowering of impact strength and the initial shock resistance can hardly be maintained. The present inventors conducted a strenuous study with a view to solving such problem and arrived at the conclusion that the problem can be solved by using an improved resin having excellent weatherability for the front surface layer 1 and the ordinary resin for the back surface layer 2 and the intersticed inner layer 3. The thermoplastic synthetic resins having food weatherability, which can be used for the surface layer 1, include copolymers of acrylic rubber essentially consisting of butyl acrylate, acrylonitrile and styrene; copolymer of methyl methacrylate and said copolymer; and copolymer of methyl methacrylate and n-butyl acrylate. However, the strengths of these resins also decrease to 50 percent when the reasons are exposed ultraviolet rays for 1,000 hours, as indicated by curves A and B in FIG. 11. It has been found that the strength lowering of the surface layer 1 can be completely prevented by integrally bonding the intersticed layer 3 with the surface layer 1 through the interfused layer 4, which intersticed layer 3 is reinforced and integral with the surface layer 2 through the interfused layer 5. This is the very advantage of the embodiment being discussed. The structural material according to this embodiment has, in addition to the advantages described previously, the advantage that the gradual strength lowering can be prevented by the inexpensive ABS resin and weatherability can be imparted without increasing the cost. The structural material of the invention described above can be produced continuously at a low cost by an apparatus which will be described hereunder: As shown in FIG. 4, the apparatus is essentially composed of a main extruder 10, two auxiliary extruders 11, 12, a shaping die 13, thickness regulating rolls 14, 15, guide rolls not shown and a take-up roll. In a practical production apparatus, there is provided, in addition to the elements mentioned above, a cutter, etc., similar to the ordinary sheet producing apparatus. The main extruder 10 is provided for extruding the inner layer 3 of the structural material and any known extruder can be used therefor which is adapted to extrude the inner layer-constituting resin. The auxiliary extruders 11, 12 are provided for extruding the surface layers 1, 2 of the structural material and required to be compact in form, has good mounting adaptability and is easy to move, in view of the connection with the due 13 and mounting space. In order to produce a number of structural materials having layers of different thickness ratio, the main and auxiliary extruders are preferably of the type in which the quantity of the extruded resin is adjustable. The shaping die 13 is the main element of the apparatus and will be described in detail later. The thickness regulating rolls 14, 15 each have an outer diameter of 200 - 300 mm and the surfaces thereof are coated with a hard chromium plating. Each of these rolls has a double-shell structure and is heated under controll by hot water or a heat transferring oil circulating in the cavity formed therein. The take-up rolls, not apparent in the drawing, may be of any known type, provided that the peripheral speed difference between them and the thickness regulating rolls 14, 15 can be adjusted with accuracy. The shaping die 13 is to shape the structural material in one step by extrusion molding and has formed therein a primary passageway 16 for leading an inner layer-constituting resin and primary passageways 17, 18 for leading surface layer-constituting resins of the structural material. The passageway 16 and the passageways 17, 18 are joined together in the shaping are 13 and connected with a secondary passageway 19 which extends towards an exit 20. Reference numerals 21, 22 designate die lips and the gap formed therebetween is finely adjustable by bolts 23. In order that the molten resins fed into the die 13 may flow smoothly to the joining point in wide width, a coat hanger type manifold shown in FIGS. 6 and 7 is employed for the primary passageways 16, 17, 18. A choke bar 24 is provided in each primary passage so as to regulate the thickness of each layer to a predetermined value. The diameter and the angle of inclination of the manifold of the coat hanger portion are preferably such that the thickness of each layer can be regulated by a minimum adjustment of the choke bar 24 irrespective of the type and viscosity of the resin introduced into the die. The following problem will arise when the temperature difference between the resins passing through the primary passages 16, 17, 18 and the resins passing through the secondary passageway 19 is not smaller than 10° C.: Namely, if the temperature of the molten resins to constitute the surface layers 1, 2 is 10°C. or more higher than the temperature of the molten resin to constitute the inner layer 3, the surface temperature of the inner layer will excessively rise when said layer is brought into contact with the surface layers at the joining point. As a result, an excessively large number of bubbles are formed when these layers are extruded from the die 13 and these bubbles are joined together to form over-sized bubbles as shown in FIG. 8. This results in uneven thickness of the structural material and also causes the surface layers to tend to separate from the inner layer along the dotted lines. Furthermore, the bonding strength between the surface layers 1, 2 and the intersticed inner layer 3 is reduced. For this reason, the temperature difference in the die 13 must be within the range specified above. It is also necessary that the temperature of the resin passing in each passageway is gradually lowered from the entrance towards the exit and is uniform over the width of the layer at any point. Otherwise, smooth flow of the resin within the die 13 cannot be obtained and the thickness of the shaped structural material cannot be made uniform by the thickness regulating rolls 14, 15. By reason of the fact that the die 13 is exposed to the atmosphere, it tends to be cooled at the side surfaces thereof and, therefore, it is preferable to maintain said portions of the die at a temperature higher than the temperature of the other portions. In the die shown, such temperature control is achieved by electric heater-type heating panels 25 attached to the surface of the die 13. These heating panels are independent of each other and indicated by reference numerals 25a - 25g from the left to right. The temperatures of the heating panels are respectively as follows:

| Passageway<br>Heating panel | 16 | 17 | 18 |
| --- | --- | --- | --- |
| 25a | 165 – 175°C | 170 – 180°C | 170 – 180°C |
| 25b | 165 – 175 | 170 – 180 | 170 – 180 |
| 25c | 163 – 173 | 168 – 178 | 168 – 178 |
| 25d | 163 – 173 | 168 – 178 | 168 – 178 |
| 25e | 163 – 173 | 168 – 178 | 168 – 178 |
| 25f | 165 – 175 | 170 – 180 | 170 – 180 |
| 25g | 165 – 175 | 170 – 180 | 170 – 180 |

As may be understood from the above table, the temperature of the side portions of the die 13 is slightly higher than that of the central portion, and the temperature difference therebetween is preferably in the range of 2° – 5°C. The die is heated only at the portions surrounding the primary passageways 16, 17, 18 and the temperature of the die is progressively lowered at the portion surrounding the secondary passageway 19 from the joining point towards the exit. For producing a structural material having a width of 600 mm (the width of the die lips is 700 mm in this case), an extruder having a screw the rotational speed of which is designed to be used within the range of 10 – 30 r.p.m. and the diameter of which is 65 mm is used for the main extruder 10, and an extruder having a screw the rotational speed of which is designed to be used within the range of 15 – 35 r.p.m. and the diameter of which is 50 mm is used for the auxiliary extruders 11, 12. In this case, the resin pressures suitable for obtaining the desired three-layered structural material within the die 13 can be obtained by rotating the screw of the main extruder 10 at the rate of 15 – 20 r.p.m. and those of the auxiliary extruders 11, 12 at the rate of 20 – 25 r.p.m. On the other hand, when a structural material having a width of 1,450 mm is desired (the width of the die lips is 1,550 mm in this case), an extruder having a screw the rotational speed of which is designed to be used within the range of 10 – 25 r.p.m. and the diameter of which is 120 mm is used for the main extruder 10, and an extruder having a screw the rotational speed of which is designed to be used within the range of 10 – 30 r.p.m. and the diameter of which is 90 mm is used for the auxiliary extruders 11, 12, and the desired three-layered structural material can be obtained by rotating the screw of the main extruder 10 at the rate of 15 – 20 r.p.m. and those of the auxiliary extruders 11, 12 at the rate of 15 – 25 r.p.m. As the blowing agent to be blended in the inner layer-constituting resin, either azodicarbonamide or dinitrosopentane-methyltetramine is used. These blowing agents are normally used in the range of 0.1 – 2.0 percent. Hydrocarbon such as methane or butane may be impregnated in the resin in the range of 1 – 8 percent. The gap between the die lips 21, 22 is preferably 4 – 4.5 mm for producing a structural material having a void ratio of 2 and a thickness of 6 mm (the thickness of each of the surface layers 1, 2 is 1 mm and that of the intersticed inner layer is 4 mm). The extrusion molding of the structural material is commenced upon completion of the assembly of the die in the manner described above. The inner layer-constituting resin is extruded from the main extruder 10 and the surface layer-constituting resins are extruded from the auxiliary extruders 11, 12. The molten resins thus extruded are led into the primary passageways 16, 17, 18 through connectors 26 respectively. The molten resin flows in the respective primary passageways 16, 17, 18 are gradually led towards the joining point and joined at said point. Since the resin pressures are suitably controlled as described above, the occurrence of an eddy flow can be prevented and the resins are not mixed together. However, since the resins are still in the molten state, slight quantities of the adjoining resin layers are melted into each other at the boundary and an interfused layer is formed. The joined resin flow successively proceeds towards the exit. In this case, since the temperature of this portion of the die 13 is lower than the temperature of that portion where the primary passageways are formed, the heat of the surface layer-constituting resins is absorbed by the die 13 and the viscosity thereof increases. Further, the outer surfaces of the surface layers 1, 2 are shaped to be flat and smooth by pressure contact with the die lips 21, 22 during passage through the gap between said die lips. When the layers 1, 2 3 are extruded from the die 13, the pressure applied to said respective layers is removed therefrom and foaming takes place in the layer 3. AS a result of foaming, the highly viscous surface layers 1, 2 are relatively moved away from each other but the thickness of the structural material as a whole is regulates by the thickness regulating rolls 14, 15, to a predetermined value. Thereafter, the structural material is taken up in the direction of the arrow mark and completely solidified.

Although the process of the invention has been described with reference to the case of producing a three-layered structural material, it can be applied to the production of a four or more layered structural material, provided that the inner layers of the structural material are intersticed layers. The resin materials used for the formation of the layers 1, 2, 3 may be suitably selected from thermoplastic resins such as ABS-copolymers, polystryene, polyethylene, polyvinyl chloride, though variable depending upon the purpose of the product structural material. By introducing into the passageway resins of the same type but different colors, a structural material adapted for use as the outer panel of a boat, or the like can be obtained, and by introducing into one of said passageways a different type of resin, e.g., a resin having good weatherability, a structural material adapted for use as the outer panel of a boat, the body of an automobile or a panel for building construction can be obtained. The process of the instant invention will be further described with reference to the practical examples thereof.

EXAMPLE 1

An extruder having a screw of a diameter of 65 mm and two extruders each having a screw of a diameter of 50 mm were connected to the die 13 as the main extruder 10 and the auxiliary extruders 11, 12 through the connectors 26 for communication with the passageway 16 and passageways 17, 18 respectively as shown in FIG. 4, and molten ABS resin containing 0.4 percent of azodicarbonamide and heated at 170°C. was introduced into the passageway 16, molten ABS resin containing a red coloring agent and heated at 170°C. into the passageway 17 and molten ABS resin containing a blue coloring agent and heated at 170°C. into the passageway 18. In this case, the expansion ratio of the formed inner layer is about 2. The flows of the respective resins were led towards the joining point while controlling the flow rate of each resin flow by adjusting the rotational speed of the extruder screw and the position of the choke bar 24, and suppressing the foaming of the inner layer-constituting resin. The joint flow of the resins joined at the joining point was passed through the secondary passageway 19, during which period the temperature thereof was lowered by about 10°C. to increase the viscosities of the respective resins. Successively thereafter, the joint flow was passed through the gap between the die lips 21, 22, to make the outer surfaces of the surface resin layers smooth and flat, and then extruded from said die lips. The inner layer-constituting resin was allowed to foam and at the same time, the thickness of the structural material thus formed was regulated by the thickness regulating rolls 14, 15. The structural material obtained had a red-colored front surface layer having a thickness of 1 mm, a light yellow-colored intersticed inner layer having a thickness of 4 mm and a blue-colored back surface layer having a thickness of 1 mm, and the width thereof was 600 mm. The structural material thus obtained had strong foamed inner layers, with each layer molten into a unification and without being peeled off each other, and besides, it was a light-weight product having a density of 0.7.

EXAMPLE 2

An extruder having a screw of a diameter of 120 mm and two extruders each having a screw of a diameter of 90 mm were connected to the die as the main extruder 10 and the auxiliary extruders 11, 12 for communication with the passageway 16 and the passageways 17, 18 respectively in the same manner as in Example 1, and molten ABS resin containing a blowing agent in the same amount as in Example 1 and heated at 175°C. was fed into the passageway 16 and molten ABS resin heated at 180°C. into each of the passageways 17, 18. By extruding said resins in the same manner as in Example 1, a structural material was obtained which was composed of front and back plate-like surface layers each having a thickness of 1 mm and an intersticed inner layer having a thickness of 4 mm, and had a width of 1,450 mm. Incidentally, a product according to this Example was excellent in quality, having substantially the same expansion ratio and density as Example 1.

The physical properties of the three-layered structural material are shown in the Table below, in comparison with those of other conventional structural materials:

| Property | Structural material | | ABS 3-layered sheet | ABS single-layered sheet | FRP (for general purpose) | aluminum sheet | steel sheet |
|---|---|---|---|---|---|---|---|
| Density ρ | | g/cm³ | 0.7 | 1.05 | 1.6 | 2.7 | 7.8 |
| Yield strength σy | | kg/mm² | 4.1 | 4.3 | 12 | 40 | 40 |
| Modulus of longitudinal elasticity E | | kg/mm² | 156 | 230 | 1000 | 7200 | 21000 |
| $\sqrt{\sigma y/\rho}$ | | | 2.9 | 2.0 | 2.1 | 2.3 | 0.8 |
| $\sqrt[3]{E/\rho}$ | | | 7.7 | 5.8 | 6.3 | 7.2 | 3.6 |

Further, the physical properties of the three-layered structural material obtained in Example 2 are composed with those of the other conventional structural materials in FIGS. 9 and 10. FIG. 9 shows a comparison in rigidity, in which ABS three-layered sheet No. 1 is a sheet the thickness of the surface layers of which is 1 mm, and No. 2 is a sheet the thickness of the surface layers of which is 2 mm. FIG. 10 shows a comparison in shock absorbing property. By the shock absorbing property is meant a striking energy which the structural material can absorb by elastic deformation. The ABS resin structural material used in this test had a total thickness of 6 mm and the other structural materials used had the same weight as that of said ABS resin structural material.

EXAMPLE 3

A three-layered structural material of the construction shown in FIG. 1 was produced under the following conditions; A resin melted at 180°C. consisting of a copolymer of styrene, methylmethacrylate, acrylonitrile and acrylic rubber was used for the formation of the front surface layer 1, ABS resin melted at 180°C. for the formation of the back surface layer 2, and ABS resin melted at 180°C. containing 0.2 percent of azodicarbonamide for the formation of the inner layer 3. These resins, were extruded in the same manner as Example 2 and a structural material having 1 mm thick front and back surface layers 1, 2 and a 4 mm thick intersticed inner layer 3 was obtained. The expansion ratio of the foamed inner layer in this case was about 1.5 and the density 0.8.

EXAMPLE 4

A structural material of the same construction as that of the structural material obtained in Example 2 was produced by using a resin consisting of a copolymer of acrylic rubber, acrylonitrile and styrene for the formation of the front surface layer 1, and the same resin as used in Example 3 for the formation of the back surface layer 2 and the intersticed inner layer 3 and extruding said resins at a temperature of 185°C., 180°C. and 175°C. respectively. Incidentally, the expansion ratio and density of the product were substantially same as Example 3.

An exposure that was conducted on the structural materials III, IV obtained in Examples 3 and 4, with the results shown in FIGS. 11. It was found that the structural materials had excellent weatherability. Namely, as shown in FIG. 11, the structural materials of Examples 3 and 4 retained their initial impact strengths even after the 1,000 hour exposure test. It will also be seen from FIG. 11 that the structural materials of Examples 3 and 4 are far superior in weatherability to single-layered sheets A and B of improved resin materials.

Although the present invention has been described and illustrated herein in terms of the specific embodiment thereof, it should be understood that the invention is not restricted only to the embodiment but many changes and modifications are possible within the scope not deviating from the spirit of the invention.

What is claimed is:

1. A process for producing a synthetic structural material having excellent impact resistance consisting essentially of:
   a. introducing flat surface layers consisting of molten resins and an inner layer consisting of a molten resin having a blowing agent blended therein into a die from separate entrances, respectively;
   b. joining the flows of the respective resins within the die in such a manner that the inner layer resin is interposed between the surface layers without mixing together;
   c. leading the joined resin flows toward an exit while gradually lowering the temperatures and thereby increasing the viscosities of the surface layer resins;
   d. applying a suitable pressure to the outer surfaces of the surface layer resin flows to shape said surfaces smooth and flat;
   e. upon completion of the shaping, extruding the joint flow from the die whereupon said pressure is removed from said surfaces, thereby allowing the inner layer resin to foam, and
   f. then regulating the thickness of the resultant extruded material by thickness regulating members; said blowing agent being added to the inner layer resin in such proportions as to produce a foamed inner layer having an expansion ratio of between 1.3 and 5, and wherein the surface layers are integrally bonded to the inner layer through interfused layers formed during the extrusion process, thereby avoiding the use of an adhesive.

2. A process according to claim 1 wherein the temperature difference between the molten resins constituting the outer layer and the molten resin constituting the inner layer is less than 10°C in the process steps.

3. A process according to claim 1 wherein one of the surface layer resins is different in physical characteristics from the other.

4. A process according to claim 3 wherein one of the surface layer resins is a weather-proof resin.

5. A process according to claim 1 wherein the outer surface resins and the inner layer resin consists of an acrylonitrile-butadiene-styrene copolymer.

6. A process according to claim 1 wherein the outer surface resins consist of a copolymer of acrylic rubber, acrylonitrile and styrene and the foamed inner layer consists of an acrylonitrile-butadiiene-styrene copolymer.

7. The product of the process of claim 1.
8. The product of the process of claim 4.
9. The product of the process of claim 5.
10. The product of the process of claim 6.

* * * * *